US012521734B2

(12) United States Patent
Vanholme

(10) Patent No.: US 12,521,734 B2
(45) Date of Patent: Jan. 13, 2026

(54) WATER SEPARATOR INTENDED TO BE INTEGRATED INTO A HYDROGEN MOTOR OF A VEHICLE

(71) Applicant: NOVARES FRANCE, Clamart (FR)

(72) Inventor: Laurent Vanholme, Comines (FR)

(73) Assignee: NOVARES FRANCE, Clamart (FR)

( * ) Notice: Subject to any disclaimer, the term of this patent is extended or adjusted under 35 U.S.C. 154(b) by 346 days.

(21) Appl. No.: 18/031,025

(22) PCT Filed: Oct. 15, 2021

(86) PCT No.: PCT/FR2021/051796
§ 371 (c)(1),
(2) Date: Apr. 10, 2023

(87) PCT Pub. No.: WO2022/079395
PCT Pub. Date: Apr. 21, 2022

(65) Prior Publication Data
US 2023/0372951 A1    Nov. 23, 2023

(30) Foreign Application Priority Data

Oct. 16, 2020    (FR) ...................................... 2010633

(51) Int. Cl.
*B01D 45/16*    (2006.01)
*B01D 45/02*    (2006.01)
(Continued)

(52) U.S. Cl.
CPC ............... *B04C 5/04* (2013.01); *B01D 45/02* (2013.01); *B01D 45/16* (2013.01); *H01M 8/04164* (2013.01); *H01M 2008/1095* (2013.01)

(58) Field of Classification Search
CPC .......... B04C 5/04; B01D 45/02; B01D 45/16; B01D 2256/16; B01D 2257/80;
(Continued)

(56) References Cited

U.S. PATENT DOCUMENTS 2,473,602 A    6/1949   Lavigne
3,778,984 A    12/1973  Lawser
(Continued)

FOREIGN PATENT DOCUMENTS

JP    2017147159 A    8/2017

OTHER PUBLICATIONS

International Search Report for corresponding application PCT/FR2021/051796 filed Oct. 15, 2021; Mail date Jan. 5, 2022.

*Primary Examiner* — Dung H Bui
(74) *Attorney, Agent, or Firm* — CANTOR COLBURN LLP

(57) ABSTRACT

A water separator intended to extract water droplets from a mixture of water droplets and dihydrogen gas previously pressurized, the water separator including a separation chamber having an inlet intended to introduce the mixture, a swirling motion setting device capable of projecting water droplets against a porous wall when the mixture is introduced into the inlet, a first outlet intended to receive hydrogen separated from the water, a collection chamber, separated from the separation chamber by a porous wall, the collection chamber having a second outlet capable of receiving water by gravity, the porous wall including a damping element capable of limiting the spreading of a water droplet projected onto the porous wall.

8 Claims, 4 Drawing Sheets

(51) Int. Cl.
   *B04C 5/04* (2006.01)
   *H01M 8/04119* (2016.01)
   *H01M 8/10* (2016.01)

(58) Field of Classification Search
   CPC .......... B01D 2259/4566; B01D 53/26; H01M 8/04164; H01M 2008/1095; H01M 2250/20; H01M 8/04156; H01M 8/1004; Y02E 60/50; Y02T 90/40
   See application file for complete search history.

(56) References Cited

U.S. PATENT DOCUMENTS

| | | | |
|---|---|---|---|
| 5,338,253 A * | 8/1994 | Damsohn | B01D 53/0407 454/158 |
| 7,074,261 B2 * | 7/2006 | Murphy | B01D 46/02 55/482 |
| 9,853,303 B2 | 12/2017 | Peterson | |
| 2002/0065000 A1 * | 5/2002 | Morozumi | H01M 8/0226 439/627 |
| 2005/0242008 A1 * | 11/2005 | Simpson | B04C 5/04 209/717 |
| 2009/0205297 A1 | 8/2009 | Sakakida | |
| 2012/0202682 A1 * | 8/2012 | Shirvanian | B01J 35/56 502/300 |
| 2013/0017135 A1 * | 1/2013 | Anderson | B01D 53/8668 423/210 |
| 2016/0100728 A1 * | 4/2016 | Lavoie | B01D 46/2403 55/447 |
| 2016/0256811 A1 * | 9/2016 | Demonie | F01P 11/06 |
| 2016/0339453 A1 | 11/2016 | Lam | |
| 2017/0047591 A1 * | 2/2017 | Fischel | H01G 11/26 |
| 2018/0126389 A1 * | 5/2018 | Lefsrud | B01D 45/16 |
| 2019/0282942 A1 | 9/2019 | Mishima | |
| 2019/0319278 A1 * | 10/2019 | Hayes | H01M 4/661 |
| 2019/0329156 A1 * | 10/2019 | Hoffman | B60T 17/004 |
| 2020/0318585 A1 * | 10/2020 | Herman | F02M 35/024 |
| 2020/0381744 A1 * | 12/2020 | Park | B05C 11/1034 |
| 2022/0184433 A1 * | 6/2022 | Curtis | B01D 45/16 |
| 2022/0280896 A1 * | 9/2022 | Hirozawa | B01D 71/56 |
| 2023/0372951 A1 * | 11/2023 | Vanholme | B01D 53/26 |

* cited by examiner

WATER SEPARATOR INTENDED TO BE INTEGRATED INTO A HYDROGEN MOTOR OF A VEHICLE

TECHNICAL FIELD

The present disclosure relates to the field of engines, in particular engines operating using dihydrogen (hereinafter referred to as "hydrogen engines").

BACKGROUND

Typically, hydrogen engines are of two distinct designs: either they operate like a conventional internal combustion engine coupled to a reservoir, or they have an electric motor connected to a fuel cell system. The disclosure refers to the field of hydrogen engines equipped with a fuel cell system.

A fuel cell system or power module is a system integrating a fuel cell and auxiliary equipment so that its main function, the supply of electrical power, can be fulfilled. These components ensure, for example, the supply of reagents, their packaging, the evacuation of products and of heat, the conduction and transformation of electricity for the benefit of electrical consumer equipment (various auxiliary electric motors, etc.).

In general, a fuel cell includes a stacking of elementary cells which form a "stack". Each elementary cell comprises two electrodes, an anode and a cathode separated by an electrolyte allowing the passage of ions. At the anode occurs an oxidation reaction, and at the cathode occurs a reduction reaction.

There are different types of fuel cells, generally classified according to the nature of their electrolyte.

In acid electrolyte cells, H+ ions migrate from the anode to the cathode, while in basic electrolyte cells, negative ions migrate from the cathode to the anode. The disclosure relates to acid electrolyte fuel cells.

Among acid electrolyte cells, two families, for which the fuel is dihydrogen, can be distinguished: PEMFC cells (Proton Exchange Membrane Fuel Cell), and PAFC cells (Phosphoric Acid Fuel Cell). In PEMFC cells, the electrolyte consists of a solid polymer membrane and the operating temperatures are low (20-100° C.). PAFC-type cells (Phosphoric Acid Fuel Cell) use liquid phosphoric acid as electrolyte trapped in a porous solid matrix. They can operate at up to 200° C. The disclosure concerns in particular these two categories.

In such a fuel cell, hydrogen is brought to the anode, and is transformed into an H+ ion by releasing electrons. The electrons are attracted by the cathode, but are blocked by the electrolyte membrane which can be crossed by the ions to reach the cathode. The H+ ions reaching the cathode are combined with $O_2$ ions formed from the oxygen in the air, to form water. The transfer of H+ ions and of electrons to the cathode allows the production of direct electric current from hydrogen.

However, the reaction within the fuel cell produces a mixture of several products, in particular water, in the form of droplets and of dihydrogen.

Throughout the remainder of the description, the term "mixture" refers to such a mixture comprising water in the form of droplets and dihydrogen.

There is a need to discharge the water from the hydrogen-water mixture so as not to limit the efficiency of the engine.

It is known, for example, to equip the fuel cell system with a separator, disposed downstream of the fuel cell. Such a separator is, for example, described in the document U.S. Pat. No. 9,853,303 B2, and is embodied commonly in the shape of a cylindrical casing. A mixture of water droplets-dihydrogen from the fuel cell is brought under pressure through an inlet orifice within the casing, a vent arranged at the bottom of the cylinder makes it possible to give the mixture a swirling flow. This flow reaches a grid arranged at the bottom of the cylinder, so as to allow the separation of water and dihydrogen. The dihydrogen hitting the grid changes direction and is expelled through a first output orifice connected to a conduit formed in the vent. The water droplets pass through the grid, and are discharged by a second output orifice.

However, in such a separator, some of the water droplets hitting the grid can rebound and be discharged into the vent with the dihydrogen. The separation function is therefore perfectible.

BRIEF SUMMARY

The present disclosure aims to overcome the aforementioned drawbacks.

The disclosure provides a separator making it possible to improve the separation of the water droplets-dihydrogen compared to the devices known from the prior art.

The disclosure also provides a separator which is easy to manufacture, has a minimal bulk, and can be easily integrated into a hydrogen engine.

The disclosure also provide a fuel cell unit equipped with such a separator.

The disclosure also provide a hydrogen engine incorporating such a fuel cell unit.

The disclosure also provide a vehicle equipped with such an engine.

To this end, firstly, a separator for a hydrogen engine intended to extract water droplets from a mixture comprising water droplets and dihydrogen gas previously pressurized is provided, the separator comprising a separation chamber comprising an inlet intended to introduce the mixture, a swirling motion device capable of projecting water droplets against a porous wall when the mixture is introduced into the inlet, a first outlet intended to receive hydrogen separated from the water, a collection chamber, separated from the separation chamber by a porous wall, the collection chamber comprising a second outlet capable of receiving water by gravity, the porous wall comprising a damping element capable of limiting the spreading of a water droplet projected onto the porous wall.

Thanks to the damping element, droplets projected onto the porous wall are devoid of rebound when they hit said wall, and are not sent back into the dihydrogen mixture which is intended to be discharged from the separator.

According to one embodiment, the damping element comprises a receiving surface provided with projecting protuberances.

According to one embodiment, the receiving surface comprises openings, a protuberance being surrounded by openings.

According to one embodiment, the damping element is made of elastomer.

Advantageously, the porous wall comprises a frame of circular shape, the damping element being positioned on the frame, which comprises a plurality of radially oriented arms, interconnected by orbital connecting segments.

Advantageously, the chambers are arranged in a cylindrical casing, the casing comprising an upper wall, a lower wall, a side wall connecting the upper wall to the lower wall, the first outlet comprising a cylindrical vent projecting from the center of the upper wall and extending within the separation chamber without reaching the porous wall.

Advantageously, the inlet is disposed on the side surface close to the upper wall, a tube extending upstream of the inlet towards the vent comprising a fixed propeller, the tube being connected to a passage opening out facing the porous wall.

Secondary, there is provided a fuel cell unit comprising the separator presented hereinabove.

Thirdly, there is provided a hydrogen engine comprising a fuel cell unit as presented hereinabove.

Fourthly, there is provided a motor vehicle equipped with the hydrogen engine as presented hereinabove.

BRIEF DESCRIPTION OF THE DRAWINGS

Other features and advantages of the disclosure will appear more clearly and concretely on reading the following description of embodiments, made with reference to the appended drawings in which.

DETAILED DESCRIPTION

Figure 1:
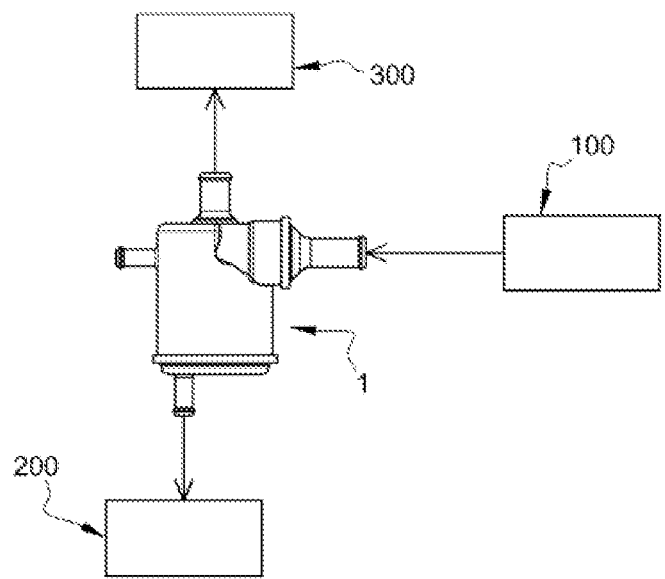
FIG. 1 illustrates a schematic diagram of a fuel cell system.

Reference is made to FIG. 1 which partially represents an example of a fuel cell system, intended to be integrated within a hydrogen engine (not represented) of a motorized vehicle (not represented), for example a motor vehicle, for driving an electric motor.

Such a fuel cell system is equipped with a fuel cell 100 and a water separator 1. The water separator 1 allows the separation of the water contained in a mixture coming from the fuel cell 100. This mixture comprises dihydrogen in the form of wet gas, that is to say it comprises water droplets, and is intended to be pressurized, in other words to be driven at a non-zero speed before being introduced into the water separator 1.

As shown in FIG. 1, the water separator 1 is therefore connected to the fuel cell 100, to a reservoir 200 for collecting water separated from hydrogen and to an element 300 for collecting hydrogen separated from water.

Reference is made now to FIGS. 2, 3, 4 and 8 which represent an exemplary embodiment of the water separator 1. In this exemplary embodiment, the water separator 1 comprises a casing 2, for example a cylindrical casing.

In the embodiments represented, the casing 2 comprises an upper portion 3 and a lower portion 4.

Figure 2:
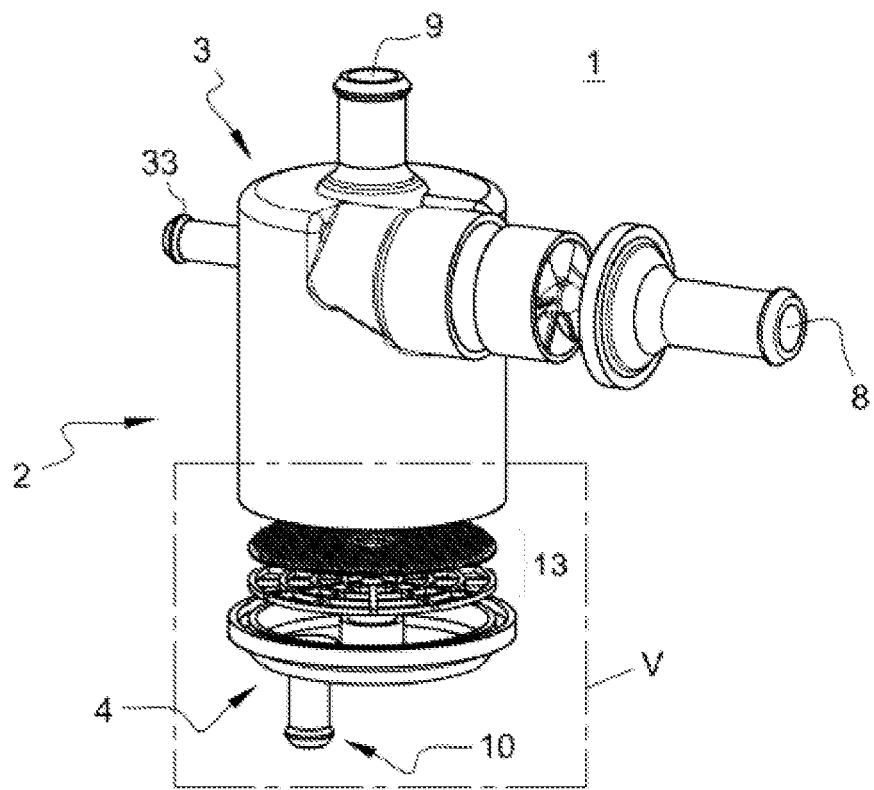
FIG. 2 illustrates a schematic perspective view of a separator, represented in a partially exploded view.
Figure 3:
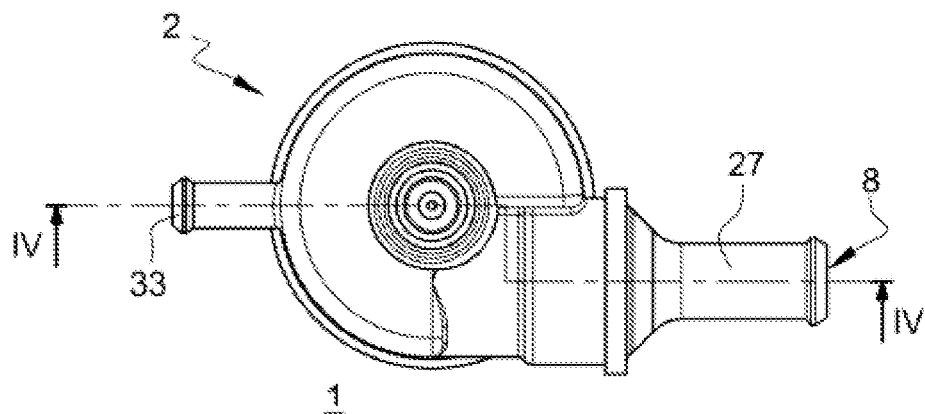
FIG. 3 represents a schematic top view of the separator.

As can be seen in FIG. 2, the casing 2 has a generally cylindrical rotary shape, and comprises a cylindrical side wall 5, disposed between an upper wall 6 and a lower wall 7.

The casing incorporates, for example, an inlet 8 intended to receive the mixture coming from the fuel cell 100, a first outlet 9 intended to discharge hydrogen to the hydrogen collection element 300, as well as a second outlet 10 intended to discharge water to the water collection reservoir 200. The inlet 8, the first outlet 9, the second outlet 10 are for example in the form of orifices with substantially circular rims opening into the water separator 1.

Optionally, a third outlet 33, connected to a valve (not represented) is provided, in order to regulate the pressure within the water separator 1.

As explained in more detail hereinbelow, the water droplets of the mixture introduced under pressure into the casing 2 are projected by centrifugation, thanks to a swirling motion setting device, making it possible to separate the water droplets from the dihydrogen.

Figure 4:
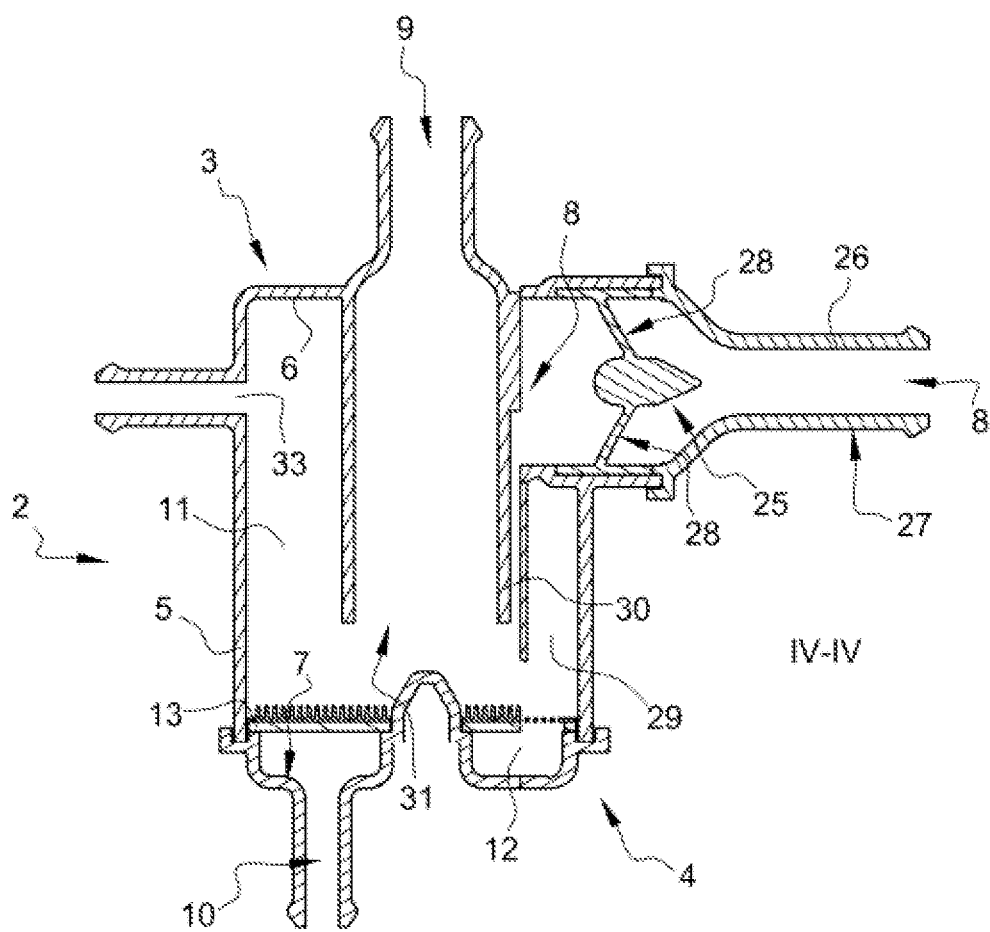
FIG. 4 represents a schematic sectional view along the plane IV-IV of FIG. 3.

More particularly, and as can be seen in FIG. 4, the casing 2 comprises a separation chamber 11 and a collection chamber 12, separated from each other by means of a porous wall 13.

The first inlet 8 opens onto such a separation chamber 11, the first outlet 9, intended to discharge dihydrogen, extending from the separation chamber 11 in order to allow its discharge towards the element 300.

The separation chamber 11 comprises at least one swirling setting device, which is described hereinbelow in the present description.

The collection chamber 12, separated from the separation chamber 11, allows the retrieval of the water droplets projected directly and indirectly against the porous wall 13. The second outlet 10 is connected to the collection chamber 12, and retrieve the water to discharge it from the fuel cell system via a dedicated circuit, not detailed herein, which may comprise a reservoir 200. In order to facilitate the discharge of water, by gravity, the second outlet 10 is disposed on the lower portion 4 of the water separator 1.

Advantageously, the porous wall 13 is positioned close to the lower wall 7. The water droplets then hit, or impact by gravity the porous wall 13 and then spread out over a receiving surface 14 of the porous wall 13. The droplets then flow through openings 15 formed in the porous wall 13. In this manner, each water droplet can pass from the separation chamber 11 to the collection chamber 12.

As can be seen in FIGS. 3 to 7, the porous wall 13 comprises a damping element 16 receiving the droplets. Such a damping element makes it possible to absorb the energy of the droplets crashing on the porous wall 13, prior to their passage within the openings 15. Such a feature has the effect of limiting the speed of the droplets during their impact on the receiving surface 14. In addition, the spreading of the droplets on the receiving surface 14 is able to be reduced. In this manner, the rebound of droplets is significantly limited, which makes it possible to improve the separation of water from the water-dihydrogen mixture entering the water separator 1.

Advantageously, the damping element 16 comprises for example the receiving surface 14, the openings 15, and is advantageously provided with a plurality of projecting protuberances 17.

Advantageously, the openings 15 are positioned on the damping element 16 between solid sections receiving the protuberances 17. In other words, the protuberances are separated from each other by openings 15. In this manner, the protuberances 17 exert a damping effect before a droplet of water penetrates an opening 15, as can be seen in FIG. 6.

Figure 5:
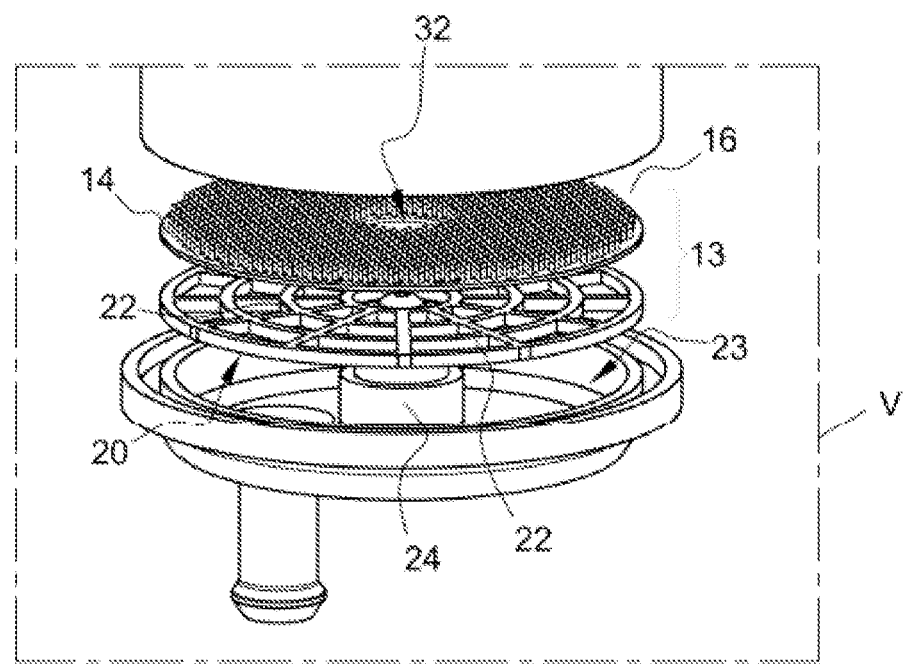
FIG. 5 represents a detail view of the area V of FIG. 2.
Figure 6:
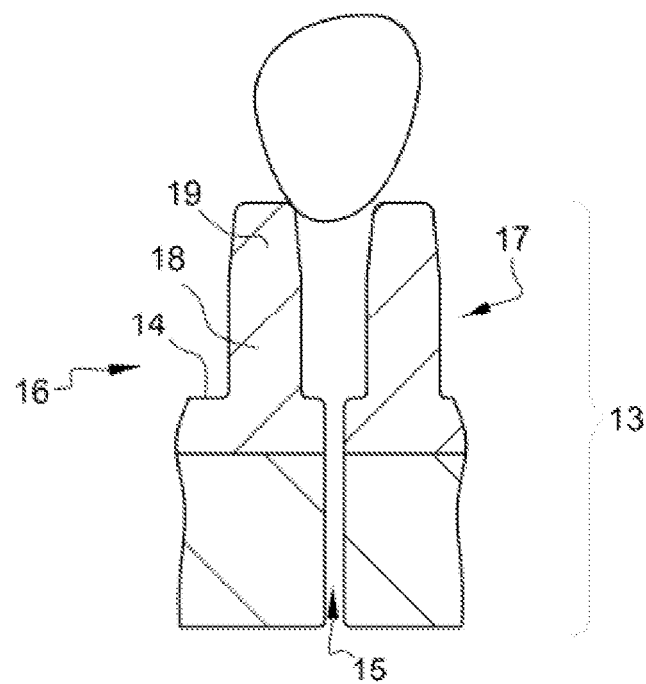
FIG. 6 represents a cross-sectional schematic detail view of a porous wall of the separator along the plane IV-IV of FIG. 3, and a drop coming into contact with the porous wall in the figure.
Figure 7:
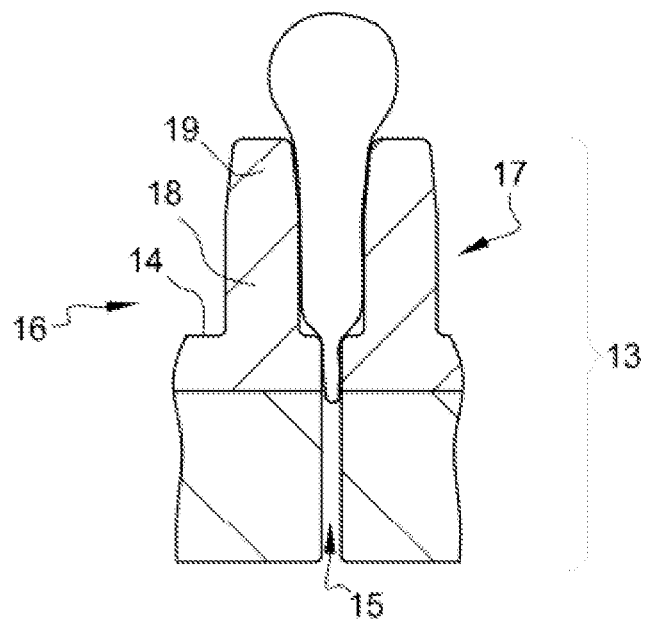
FIG. 7 represents a cross-sectional schematic detail view of a porous wall of the separator along the plane IV-IV of FIG. 3, and a drop penetrating the porous wall.

Advantageously, as can be seen in FIGS. 5 to 7, the protuberances 17 have a cylindrical rotary portion 18, supplemented by a tapered end portion 19. Such a shape allows a damping of the water droplets, while allowing an easy manufacture for example by injection molding.

Advantageously, the damping element 16, in particular the protuberances 17, is made of elastomer, for example of EPDM (ethylene-propylene-diene monomer). In this manner, the protuberances 17 have increased viscosity and deformation capacity, favoring the slowing down and the spreading of the water droplets crashing on the porous wall 13. In this manner, any rebound of the water droplets is limited.

Advantageously, the porous wall 13 comprises a frame 20 intended to allow its support within the water separator 1, for example on the lower portion 4.

As represented in particular in FIG. 5, the frame 20 is in the form of a plate, typically of cylindrical shape, and advantageously includes a plurality of arms 21, for example radially oriented, interconnected by orbital connecting segments 22.

Advantageously, the porous wall 13 is positioned on the lower portion 4 of the water separator 1. Such an arrangement makes it possible to reduce the bulk of the water separator 1, and to facilitate the mounting of the porous wall 13 within the water separator 1.

In order to facilitate the mounting of the porous wall 13, each of the damping element 16 and the frame 20 has a dimension complementary to a casing 23 provided in the lower portion 4.

In order to allow better retention in position, and to facilitate assembly, the lower portion 4 is, for example, provided in its center with a boss 24, of cylindrical shape, configured to cooperate by insertion with apertures 32 provided in the center of the damping element 16 and of the frame 20.

The swirling motion setting device will now be described more particularly with reference to FIGS. 4 and 8.

In the represented embodiment, two elements for setting swirling motion are implemented.

A first swirling motion setting element comprises for example a fixed propeller 25, disposed upstream of the inlet 8, for example within the internal walls 26 of an inlet tube 27. More specifically, the fixed propeller 25 advantageously comprises blades 28 extending from the axis of extension of the tube 27. In this manner, the flow of incoming mixture is set into swirling motion along the axis of extension of the tube 27, allowing some of the water droplets to be projected along the internal walls 26.

In the exemplary embodiment represented in FIG. 4, the blades 28 are advantageously inclined towards the side wall 5, making it possible to increase the projection of the flow of the incoming mixture against the internal walls 26.

In order to allow good discharge of the water retrieved using this first swirling motion setting element, the separation chamber 11 comprises a cavity 29. A passage 30 is thus defined between the vent 31 and the cavity 29, allowing the delivery of retrieved water to the porous wall 13, and the collection chamber 12.

A second swirling motion setting element comprises for example a vent 31, with a cylindrical rim, projecting along the axis of rotation of the casing, from the upper wall 6 passing through a portion of the separation chamber 11, without however reaching the porous wall 13. A clearance is thus left between the vent 31 and the porous wall 13.

The vent 31 advantageously comprises the first outlet 9, which makes it possible to retrieve the flow of gas freed from water droplets. The clearance between the vent 31 and the porous wall 13 prevents accidentally undamped droplets from being discharged in the first outlet.

Such a vent 31 which is disposed within a cylindrical side wall 5 allows the setting in swirling or helical motion of a pressurized humid gas mixture when introduced into the separation chamber 11 by an inlet 8 disposed offset with respect to the axis of rotation of the vent 31 and the side wall 5.

Indeed, by arranging the inlet 8 within the side wall 5 tangentially to the side wall 5, that is to say the axis of the inlet 8 being perpendicular and having an offset relative to the axis 3 of the vent 31, a flow of the mixture introduced under pressure is set in a helical movement around the axis of extension YY' of the side wall 5.

The water separator 1 comprises at least one swirling motion setting element, but according to the represented embodiment, the water separator 1 comprises the first and the second swirling motion setting elements, which makes it possible to improve separating water from the water-dihydrogen mixture.

Figure 8:
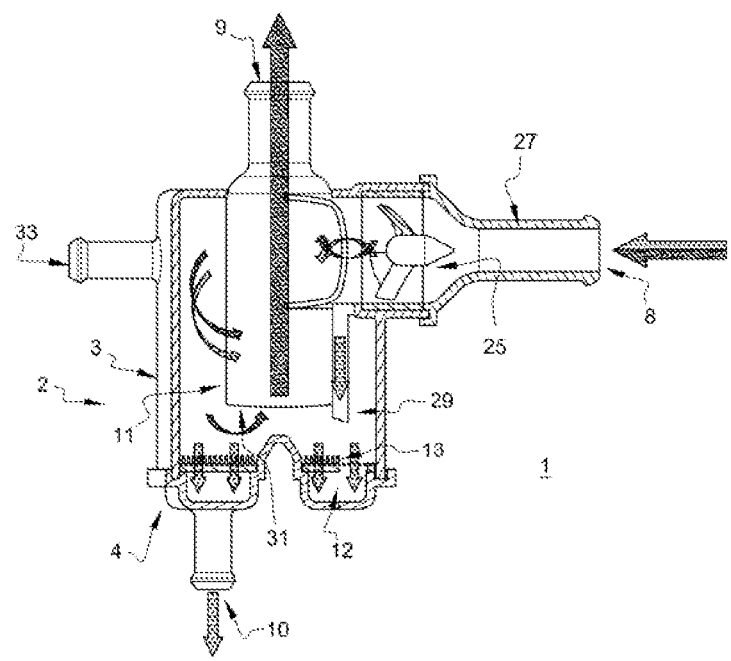
FIG. 8 represents a schematic sectional view of the separator along the plane IV-IV of FIG. 3.

An example of the overall operation of a water separator 1 described hereinabove, and represented in a simplified manner in FIG. 8, is now described.

As shown by the directional arrows in FIG. 8, an incoming flow penetrates via the tube 27 and undergoes a first setting in swirling motion following the passage through the fixed propeller 25. The water retrieved after its passage through the fixed propeller 25 is directed towards the porous wall 13 thanks to the passage between the vent 31 and the cavity 29. The flow is set in swirling motion along the axis of rotation of the casing 2 by rotating around the vent 31. The water droplets are projected against the side wall 5, and bounce until they fall against the porous wall 13. The flow thus cleared of water droplets is discharged via the vent 31.

Such a water separator 1 offers many advantages, among which;
- easy manufacture, for example by injection molding, which makes it possible to limit the production costs,
- small bulk,
- possibility of offering two steps or stages of water separation, making it possible to minimize the residual water in the mixture

The invention claimed is:

1. A water separator for an engine intended to extract water droplets from a mixture comprising water droplets and dihydrogen gas previously pressurized, the separator comprising:
   a separation chamber comprising an inlet intended to introduce the mixture, a swirling motion setting device capable of projecting water droplets against a porous wall when the mixture is introduced into the inlet, a first outlet being intended to receive hydrogen separated from the water, and
   a collection chamber, separated from the separation chamber by a porous wall, the collection chamber comprising a second outlet capable of receiving water by gravity,
   wherein the porous wall comprises a damping element capable of limiting the spreading of a water droplet projected onto the porous wall,
   wherein the damping element comprises a receiving surface provided with openings and projecting protuberances, the protuberances being separated from each other by openings, and
   wherein each protuberance has a cylindrical rotary portion supplemented by a tapered end portion.

2. The water separator according to claim 1, wherein the damping element is made of elastomer.

3. The water separator according to claim 1, wherein the porous wall comprises a frame of circular shape, the damping element being positioned on the frame, the frame comprising a plurality of radially oriented arms interconnected by orbital connecting segments.

4. The water separator according to claim 1, wherein the separation and collection chambers are arranged in a cylindrical casing, the casing comprising an upper wall, a lower wall, a side wall connecting the upper wall to the lower wall, the first outlet comprising a cylindrical vent projecting from the center of the upper wall and extending within the separation chamber without reaching the porous wall.

5. The water separator according to claim 4, wherein the inlet is disposed on the side surface close to the upper wall, a tube, extending upstream of the inlet towards the vent comprising a fixed propeller, the tube being connected to a passage opening out facing the porous wall.

6. A fuel cell unit comprising the water separator according to claim 1.

7. A hydrogen engine comprising a fuel cell unit according to claim 6.

8. A motor vehicle equipped with the hydrogen engine according claim 7.

\* \* \* \* \*